United States Patent [19]

Uramoto

[11] Patent Number: 5,175,675

[45] Date of Patent: Dec. 29, 1992

[54] SWITCHING REGULATOR IN WHICH OSCILLATION IS MAINTAINED BELOW A PREDETERMINED FREQUENCY

[75] Inventor: Hiroshi Uramoto, Hadano, Japan

[73] Assignee: Ricoh Company, Ltd., Tokyo, Japan

[21] Appl. No.: 651,805

[22] Filed: Feb. 7, 1991

[30] Foreign Application Priority Data

Feb. 9, 1990 [JP] Japan .................. 2-29947

[51] Int. Cl.⁵ ......................................... H02M 3/335
[52] U.S. Cl. ....................................... 363/19; 363/97; 363/131
[58] Field of Search ............... 363/18, 19, 97, 131

[56] References Cited

U.S. PATENT DOCUMENTS

| | | | |
|---|---|---|---|
| 4,084,219 | 4/1978 | Furukawa et al. | 363/97 |
| 4,208,705 | 6/1980 | Hosoya | 363/19 |
| 4,263,643 | 4/1981 | Koike | 363/19 |
| 4,378,585 | 3/1983 | Bete | 363/19 |
| 4,443,838 | 4/1984 | Yamada | 363/19 |
| 4,605,998 | 8/1986 | Higashi | 363/97 |
| 4,654,771 | 3/1987 | Stasch et al. | 363/19 |
| 4,700,280 | 10/1987 | Onda et al. | 363/131 |
| 4,758,937 | 8/1988 | Usui et al. | 363/97 |
| 4,862,338 | 8/1989 | Tanaka | 363/97 |
| 4,942,508 | 7/1990 | Nakamura | 363/97 |
| 5,012,399 | 4/1991 | Takemura et al. | 363/18 |

OTHER PUBLICATIONS

Switching Regulator Sekkei Jissou Oyou Manual, published by Japanese Industrial Technology, pp. 80-85, Feb. 1990.

Primary Examiner—Steven L. Stephan
Assistant Examiner—Jeff Sterrett
Attorney, Agent, or Firm—Oblon, Spivak, McClelland, Maier & Neustadt

[57] ABSTRACT

A switching regulator, which applies output DC voltage to a load via an oscillator oscillatable between ON and OFF states, has an oscillation controller to control the oscillation of the oscillator based on the load so that a frequency of the oscillating of the oscillator is kept lower than a predetermined frequency irrespective of the load.

4 Claims, 6 Drawing Sheets

SWITCHING REGULATOR IN WHICH OSCILLATION IS MAINTAINED BELOW A PREDETERMINED FREQUENCY

BACKGROUND OF THE INVENTION

The present invention relates generally to switching regulators, one type of power source devices, used for a facsimile apparatus, a printer or the like, and more particularly to a switching regulator of a ringing choke converter (called R.C.C for short) type. Hereupon, the R.C.C controls output voltage by a self-oscillator which oscillates between ON and OFF states.

Figure 1:
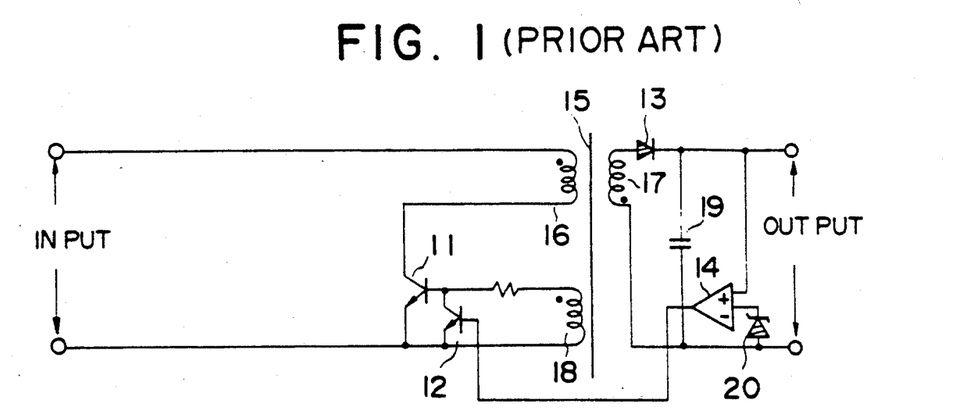
FIG. 1 shows a circuitry arrangement of a conventional R.C.C switching regulator.
Figure 2:
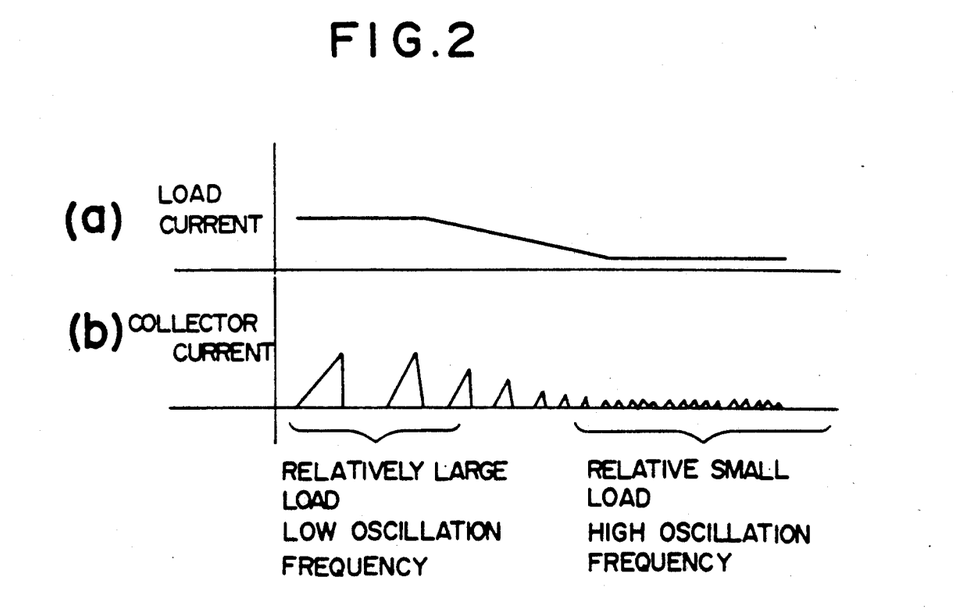
FIGS. 2a and 2b show time charts for explaining the operation of the conventional R.C.C switching regulator shown in FIG. 1.

A description will now be given of an operational principal of a conventional R.C.C. The conventional R.C.C, as shown in FIG. 1, comprises transistors 11 and 12, a rectifying diode 13, an comparator 14, a transformer 15 having a primary winding 16, a secondary winding 17, and a bias winding 18, a smoothing capacitor 19 and a zener diode 20. The transistor 11 oscillates between the ON and OFF states because of the positive feedback connection with the primary and bias windings 16 and 18. The input DC voltage is converted into rectangular voltage at the secondary winding 17, and is reconverted into the DC voltage by the smoothing capacitor 19. During this course, energy is charged to a transformer 15 while the transistor is in the ON state, and discharged therefrom to a load via the rectifying diode 13 when the transistor 11 changes to the OFF state. The transistor 12, comparator 14, and zener diode 20 control the ON state frequency of the transistor 21. The load is to be connected to the output terminal of the R.C.C. If the level of the load becomes relatively large, the output voltage is getting slightly small. And if the level of the load becomes relatively small, vice versa. The comparator 14 compares the level of output voltage with the level of constant voltage of the zener diode 20. If the level of output voltage is larger than the level of the constant voltage of the zener diode 20, the transistor 12 is set in the ON state because of a signal from the comparator 14. The load current decreases when the load becomes large, and the load current increases when the load becomes small. Hereinafter, a description will be given based on the assumption that the load current changes as shown in FIG. 2(a). Collector current of the transistor 11 changes accordingly, as shown in FIG. 2(b). According to FIG. 2, the higher a load current is, the higher peaks of the collector current of the transistor 11 is, and the lower the oscillation frequency thereof is. And the lower the load current is, vice versa. Incidentally, other features of the conventional R.C.C are explained in detail in "SWITCHING REGULATOR SEKKEI JISSOU OYOU MANUAL" published by Japanese Industrial Technology, pp. 80-85", for example. Thus, as shown in FIG. 2, when the load current is low, the conventional R.C.C oscillates incessantly, causing an instable circuit operation thereof, a high noise frequency, and a low conversion efficiency because of a switching loss.

SUMMARY OF THE INVENTION

Accordingly, it is a general object of the present invention to provide a switching regulator in which above disadvantages are eliminated.

Another object of the present invention is to provide a switching regulator in which the oscillation frequency thereof kept low enough to stabilize the circuit operation, lesson noises, and achieve the effective conversion between the input voltage and the output voltage even if the load connected to the output terminal of the switching regulator is relatively small.

The more specific object of the present invention is to provide a switching regulator, which applies output DC voltage to a load via a pair of output terminals, the output DC voltage being generated by input DC voltage from a pair of input terminals, which switching regulator comprises a first transistor oscillatable between ON and OFF states, a transformer having first and second primary windings and a secondary winding, the first primary winding being coupled between the first transistor and one of the input terminals, the second primary winding being coupled between the first transistor and another one of the input terminals, and the first and second primary windings and the first transistor constituting a positive feedback connection to oscillate the first transistor so that the input DC voltage is converted into AC voltage to be outputted from the secondary winding, conversion means, coupled to the secondary winding of the transformer, for converting the AC voltage outputted from the secondary winding into the output DC voltage, and oscillation control means, coupled to the first transistor, for controlling the oscillating of the first transistor based on the load so that a frequency of the oscillating of the first transistor is kept lower than a predetermined frequency irrespective of the load.

According to the present invention, the oscillation frequency of the first transistor is kept lower than a predetermined frequency irrespective of the load because of the oscillation control means. Therefore, the the circuit operation is stabilized, noises are lessoned, and the effective conversion between the input voltage and the output voltage is achieved even if the load connected to the output terminal of the switching regulator is relatively small.

Other objects and further features of the present invention will be apparent from the following detailed description when read in conjunction with the accompanying drawings.

BRIEF DESCRIPTION OF THE DRAWINGS

FIGS. 4a-4i, 5a, 5b, 6a, and 6b show time charts for explaining the operation of the R.C.C switching regulator shown in FIG. 3;

DESCRIPTION OF THE PREFERRED EMBODIMENTS

Figure 3:
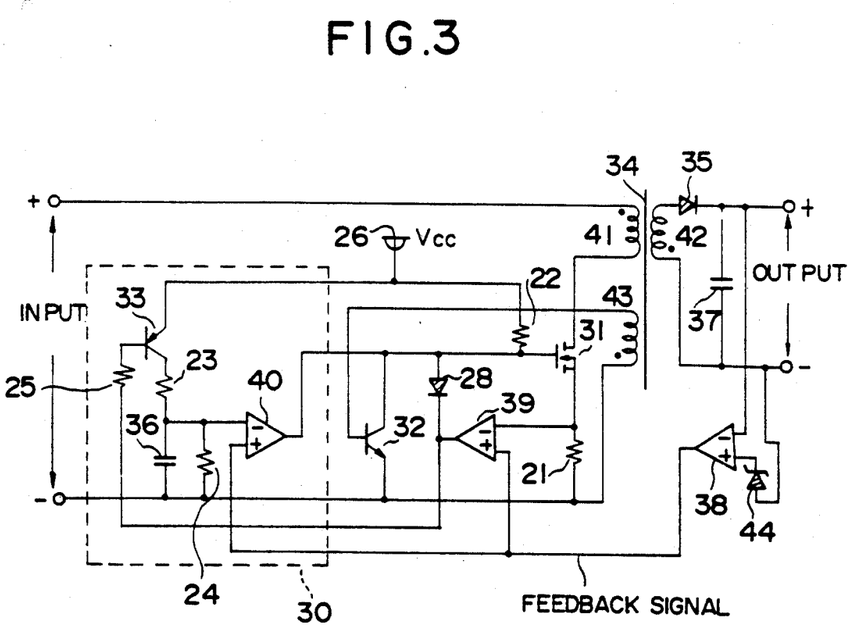
FIG. 3 shows the circuitry arrangement of a R.C.C switching regulator according to the present invention.

The switching regulator according to the present invention comprises, as shown in FIG. 3, resistances 21 and 22, a supply voltage 26, transistors 31 and 32, rectifying diodes 28 and 35, a smoothing capacitor 37, comparators 38 and 39, a zener diode 44, an OFF time control circuit 30, a transformer 34 having a primary winding 41, a secondary winding 42, and bias windings 43.

The bias winding 43 as well as the primary winding 41 are located at the primary side of the transformer 34. The OFF time control circuit 30 comprises a transistor 33, a condenser 36, resistances 23 to 25, and a comparator 40.

The transistor 31 oscillates between ON and OFF states because of positive feedback connection of the primary and bias windings 41 and 43, like the transistor 11 shown in FIG. 1, so that the input DC voltage is converted into the AC voltage. Namely, when the transistor 31 is set in the ON state, the energy is charged to the transformer 44. And when the transistor 31 is set in the OFF state, the energy is discharged from the transformer 44 to the load to be connected to the output terminal via the rectifying diode 35.

The oscillation of the transistor 31 is controlled by using the output voltage appropriate to the changable load and the discharge of the energy from the transformer 34 to the load, via the comparators 38 and 39, zener diode 44, the transistor 32, and the OFF time control circuit 30, so that the oscillation frequency is kept lower than a predetermined value irrespective of the load.

The transistor 31 is connected to open collectors of three transistors, such as the transistor 32 and output transistors of the comparators 39 and 40 by means of the wired OR method. A plus input terminal of each of the comparators 39 and 40 is respectively connected to an output terminal of the comparator 38 from which a feedback signal is outputted. The feedback signal changes as shown in FIG. 4(b) in this embodiment. The feedback signal is based on the output voltage when its level is greater than the level of the constant voltage from the zener diode. The output voltage changes in accordance with the changable load. Incidentally, it is a main object to gain constant output voltage irrespective of the changable load, so that the output voltage is illustrated as being almost flat in the FIG. 4(a). In this embodiment, the transistor 31 comprises a field effect transistor (called FET for short), however, another type of transistor may be used.

Figure 4:
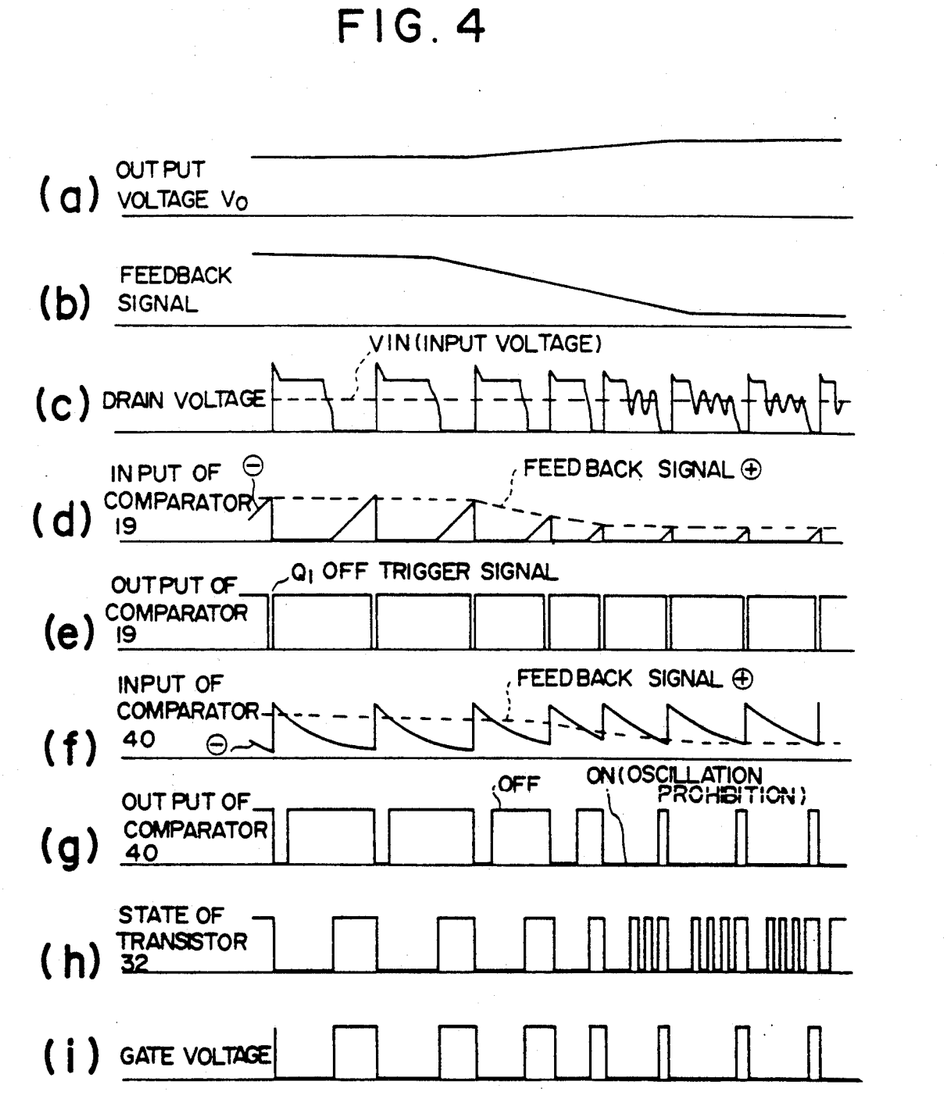

Next, a description will be given of oscillation control operation of the transistor 31 with reference to FIG. 4. Initially, no voltage is applied to a respective minus input terminal of each of the comparators 39 and 40, and the transistor 32 is set in the OFF state, whereas the transistor 31 is set in the ON state because of the constant voltage generator 26. Accordingly, source voltage composed of source current from the transistor 31 and the resister 1 is increased, as shown in FIG. 4(d), and is applied to the minus input terminal of the comparator 39. The comparator 39 outputs an OFF trigger signal when the level of the source voltage is greater than the feedback signal level from the comparator 38. The rectifying diode 28 prevents the OFF trigger signal from the comparator 39 from supplying the output to the transistor 31. If the supply voltage 26 is connected to the comparator 39, the input of the transistor 31 is kept low, consequently it is always set in the OFF state. The output terminal of the comparator 39 is connected to the transistor 33 of the OFF time control circuit 30. When the OFF trigger signal is supplied to the transistor 33, the transistor 33 is set in the ON state so that energy is charged to the capacitor 36 via the resistance 23. The capacitor 36 is connected to a minus input terminal of the comparator 40 via the resistance 24. The transistor 33 is set in the OFF state, and the energy is discharged from the capacitor 36 to the comparator 40, as shown in FIG. 4(f). The resistance 24 and the capacitor 36 constitute a time constant. The time constant determines the form of pulse trains of the input to the comparator 40, as shown in FIG. 4(f). And the OFF trigger signal, the time constant, and the feedback signal determine outputting intervals of the comparator 40, as shown in FIG. 4(g). When the output from the capacitor 36 is greater than the feedback signal from the capacitor 38, the comparator 40 outputs the oscillation prohibition signal. The time constant is constant, and the OFF trigger signal depends on the feedback signal, so that the oscillation prohibition signal interval depends on the feedback signal. The lower the feedback signal level is, the longer the oscillation prohibition interval is.

Since the comparator 40 is connected to the supply voltage 26, the input of the transistor 31 is lessened when the oscillation prohibition signal is outputted from the comparator 40. Thus, the input, which is the gate, of the transistor 31 is reversed from the ON state to the OFF state. Accordingly, the electric potential of the transformer 34 is reversed, as shown in FIG. 4(i), so that the transistor 32 is set in the ON state via the bias winding 43.

When the transistor 32 is set in the ON state, the transistor 32 is connected to the constant voltage generator, and consequently the transistor 31 is maintained in the OFF state. Thus, the transistor 31 is prohibited from oscillating itself while the comparator 40 is outputting the oscillation prohibition signal thereto.

When the transistor 31 is set in the OFF state, and the energy of the transformer 34 is transmitted to the secondary winding 35, the voltage of the transformer 34 sine-oscillates. Accordingly, the state of the transistor 32 is transferred from the ON state to the OFF state, as shown in FIG. 4(h). From this point, the transistor 32 operates based on the discharging of the transformer 34.

The state of the transistor 31 is transferred from the OFF state to the ON state only when the transistor 32 is set in the OFF state and the comparator 40 is not outputting the oscillation prohibition signal.

As mentioned with reference to FIG. 1, the input DC voltage is converted into rectangular pulse trains at the secondary winding 35, and these trains are reconverted into the DC voltage by the smoothing capacitor 37.

Figure 5:
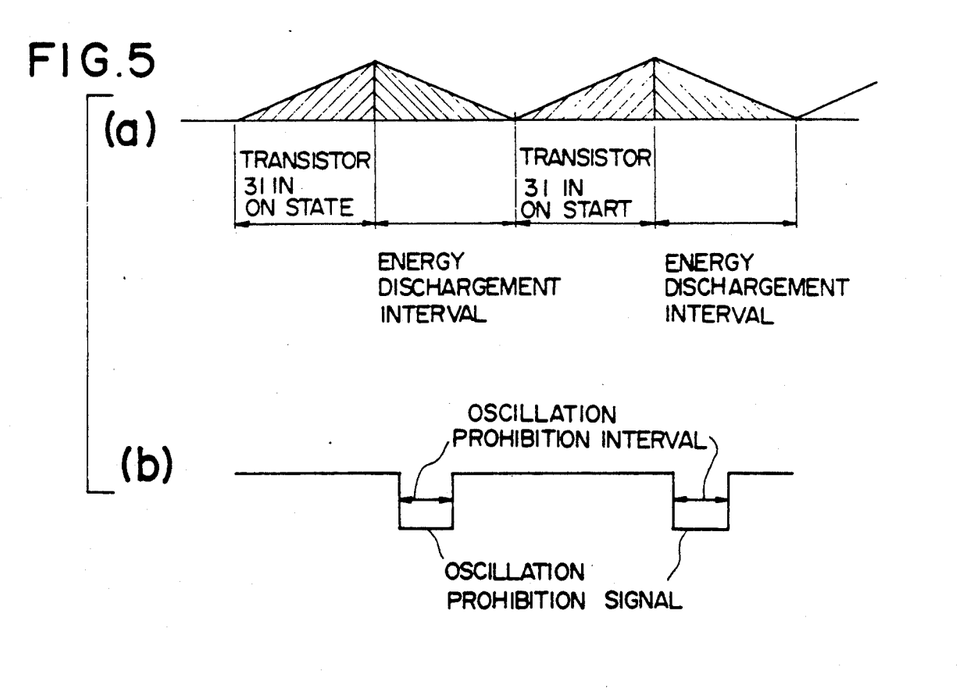
Figure 6:
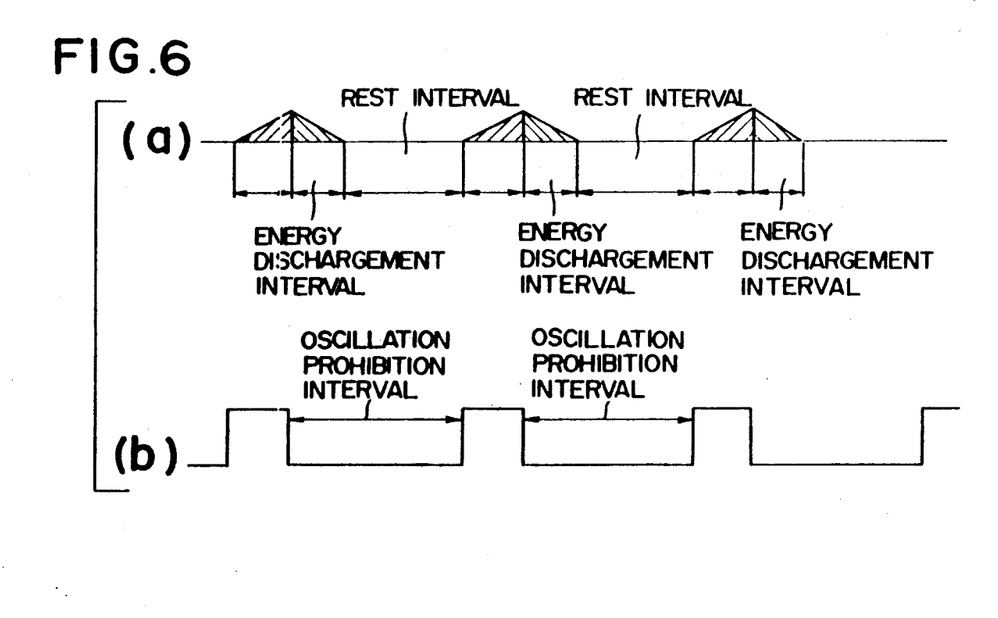

As mentioned above, the feedback signal from the comparator 38 is proportional to the load current. Therefore, the oscillation of the transistor 31 is predominantly controlled by the transistor 32 while the relatively large load is connected to the output terminals of the switching regulator, and is predominantly controlled by the comparator 40 while the relatively small load is connected to the same. FIG. 5 shows an operation of the transistor 31 while the relatively large load is connected to the output terminals, and FIG. 6 shows an operation thereof while the relatively small load is connected to the same.

FIG. 5(a) shows the energy charged in the transformer 34 while a relatively large load is connected to the output terminals, and FIG. 6(a) shows the same while a relatively small load is connected to the output terminal. FIG. 5 (b) and FIG. 6(b) respectively show an oscillation prohibition interval during which the oscillation prohibition signal is outputted from the comparator 40. In this embodiment, while a relatively large load is connected to the output terminals, the oscillation prohibition interval is shorter than an energy discharging interval during which the energy is outputted from the transformer 34. The converse can be regarded as also being true. Namely, while the oscillation prohibition interval is shorter than the energy discharging interval, the load connected to the output terminals may be regarded as being relatively large. During this time, the switching regulator operates like the conventional one. That is, the oscillation of the transistor 31 is controlled by the transistor 32. On the other hand, while a relatively small load is connected to the output terminals, the oscillation prohibition interval is longer than the energy discharging interval. As mentioned above, the converse can be regarded also true. Namely, while the oscillation prohibition interval is longer than the energy discharging interval, the load may be regarded as being relatively small. During this time, the switching regulator does not operate like the conventional one. That is, the oscillation of the transistor 31 is controlled by the comparator 40, not by the transistor 32. In this case, the transistor 31 does not oscillate itself during the oscillation prohibition interval so that it waits to oscillate itself even if the energy is discharged, for a rest interval which is appropriate to the feedback signal level. Then, the transistor 31 is set in the ON state by the trailing trigger of the comparator 40. The smaller the load is, the longer the rest interval is.

Figure 7:
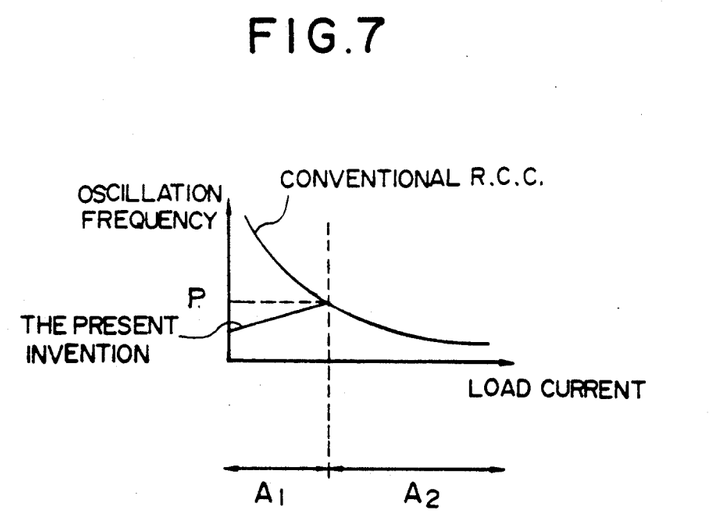
FIG. 7 shows oscillation frequency appropriate to load current of the R.C.C switching regulator according to the present invention compared with that of the conventional R.C.C switching regulator.

According to the present invention, the transistor 32 and the oscillation prohibition signal control the oscillation of the transistor 31. Therefore, the oscillation control of the transistor 31 may be divided into two areas $A_1$ and $A_2$, as shown in FIG. 7. The oscillation of the transistor 31 is predominantly controlled by the comparator 40 in the area $A_1$, and is predominantly controlled by the transistor 32 in the area $A_2$. As shown in FIG. 7, the oscillation frequency of the transistor 31 is kept lower than a predetermined value P, in which the the oscillation prohibition interval is equal to the energy discharging interval. In the area $A_1$, the oscillation frequency of the transistor 31 is lower than that of the conventional R.C.C switching regulator. Therefore, the oscillation frequency is kept low even if a relatively large load is connected to the output terminals.

Further, the present invention is not limited to these embodiments, but various variations and modifications may be made without departing from the scope of the present invention.

What is claimed is:

1. A switching regulator, which applies output DC voltage to a load via a pair of output terminals, the output DC voltage being generated by input DC voltage from a pair of input terminals, comprising:
   a first transistor oscillatable between ON and OFF states;
   a transformer having first and second primary windings and a secondary winding, the first primary winding being coupled between said first transistor and one of the input terminals, the second primary winding being coupled between said first transistor and another one of the input terminals, and the first and second primary windings and said first transistor constituting a positive feedback connection to oscillate said first transistor so that the input DC voltage is converted into AC voltage to be outputted from the secondary winding;
   conversion means, coupled to the secondary winding of said transformer, for converting the AC voltage outputted from the secondary winding into the output DC voltage; and
   oscillation control means, coupled to said first transistor, for controlling the oscillating of said first transistor based on the load so that a frequency of the oscillating of said first transistor is kept lower than a predetermined frequency irrespective of the load, said predetermined frequency corresponding to a frequency of the oscillating of said first transistor at which an oscillation prohibition interval is equal to an energy discharging interval.

2. A switching regulator according to claim 1, wherein energy depending on the input DC voltage is charged to said transformer when said first transistor is set in the ON state, and being discharged from said transformer to the load when said first transistor is set in the ON state, and being
   wherein said switching regulator further comprises a supply voltage coupled to said first transistor, and
   wherein said oscillation control means further comprises a second transistor oscillatable between ON and OFF states, and coupled between said first transistor and the second primary winding of said transformer, and
   when the second transistor is set in the ON state, the second transistor is connected to said supply voltage so that voltage which said supply voltage applies to the first transistor is reduced, consequently the first transistor is set in the OFF state, and
   the second transistor is maintained in the ON state based on the load, and then set in the OFF state.

3. A switching regulator, which applies output DC voltage to a load via a pair of output terminals, the output DC voltage being generated by input DC voltage from a pair of input terminals, comprising:
   a first transistor oscillatable between ON and OFF states;
   a transformer having first and second primary windings and a secondary winding, the first primary winding being coupled between said first transistor and one of the input terminals, the second primary winding being coupled between said first transistor and another one of the input terminals, and the first and second primary windings and said first transistor constituting a positive feedback connection to oscillate said first transistor so that the input DC voltage is converted into AC voltage to be outputted from the secondary winding;
   conversion means, coupled to the secondary winding of said transformer, for converting the AC voltage outputted from the secondary winding into the output DC voltage; and
   oscillation control means, coupled to said first transistor, for controlling the oscillating of said first transistor based on the load so that a frequency of the oscillating of said first transistor is kept lower than a predetermined frequency irrespective of the load;
   wherein energy depending on the input Dc voltage is charged to said transformer when said first transistor is set in the ON state, and being discharged from said transformer to the load when said first transistor is set in the OFF state, and
   wherein said switching regulator further comprises a supply voltage coupled to said first transistor, and
   wherein said oscillation control means further comprises a second transistor oscillatable between ON and OFF states, and coupled between said first transistor and the second primary winding of said transformer, and when the second transistor is set in the ON state, the second transistor is connected to said supply voltage so that voltage which said supply voltage applies to the first transistor is reduced, consequently the first transistor is set in the OFF state, and
the second transistor is maintained in the ON state based on the load, and then set in the OFF state;
wherein the second control means further comprises:
a third transistor oscillatable between ON and OFF states, and coupled to the supply voltage,
a first output device which outputs a feedback signal based on the output voltage based on the load,
a second output device, responsive to the first output device, which outputs an OFF trigger signal to the third transistor,
a resistance and a capacitor, coupled to the third transistor, the resistor and the capacitor constituting a time constant, and
a third output device, coupled to the resistance, the capacitor, and said first transistor, which outputs a oscillation prohibition signal to said first transistor, the oscillation prohibition signal being outputted based on the OFF trigger signal, the feedback signal, and the time constant, the first transistor being set in the OFF state while the third output device outputs the oscillation prohibition signal to the first transistor so that the first transistor is set in the ON state only when the second transistor is set in the OFF state, and the third output device not outputting the oscillation prohibition signal thereto.

4. A switching regulator according to claim 3, wherein the second transistor predominantly controls said first transistor when a first interval in the discharging of the energy from said transformer to the load is longer than a second interval in the outputting of the oscillation prohibition signal from the third output device to said first transistor, and the oscillation prohibition signal from the third output device predominantly controls said first transistor when the first interval is shorter than the second interval.

* * * * *